(12) United States Patent
Vijayaraghavan et al.

(10) Patent No.: US 10,373,177 B2
(45) Date of Patent: Aug. 6, 2019

(54) DYNAMIC PREDICTION OF ONLINE SHOPPER'S INTENT USING A COMBINATION OF PREDICTION MODELS

(71) Applicant: [24]7.ai, Inc., San Jose, CA (US)

(72) Inventors: Ravi Vijayaraghavan, Bangalore (IN); Kranthi Mitra Adusumilli, Hyderabad (IN); Subhash Ramchandra Kulkarni, Bangalore (IN); Ravi Prakash, Bangalore (IN)

(73) Assignee: [24]7.ai, Inc., San Jose, CA (US)

(*) Notice: Subject to any disclaimer, the term of this patent is extended or adjusted under 35 U.S.C. 154(b) by 1189 days.

(21) Appl. No.: 14/174,678

(22) Filed: Feb. 6, 2014

(65) Prior Publication Data
US 2014/0222503 A1    Aug. 7, 2014

Related U.S. Application Data

(60) Provisional application No. 61/762,104, filed on Feb. 7, 2013.

(51) Int. Cl.
*G06Q 30/00* (2012.01)
*G06Q 30/02* (2012.01)

(52) U.S. Cl.
CPC ............................. *G06Q 30/0201* (2013.01)

(58) Field of Classification Search
CPC ................................................ G06Q 30/0201
USPC .............................................. 705/26.1–27.2
See application file for complete search history.

(56) References Cited

U.S. PATENT DOCUMENTS

| | | | |
|---|---|---|---|
| 2005/0102292 A1* | 5/2005 | Tamayo | G06F 17/30539 |
| 2007/0078958 A1 | 4/2007 | Bennett | |
| 2009/0248496 A1 | 10/2009 | Hueter et al. | |
| 2011/0029517 A1 | 2/2011 | Ji et al. | |
| 2011/0131160 A1 | 6/2011 | Canny et al. | |
| 2011/0289015 A1* | 11/2011 | Mei | G06Q 10/04 |
| | | | 705/347 |
| 2012/0158633 A1* | 6/2012 | Eder | G06F 19/3437 |
| | | | 706/46 |

FOREIGN PATENT DOCUMENTS

WO        2007/048008        4/2007

OTHER PUBLICATIONS

Roberts, B. (1999). Rich data about customer usage. Internet World, 5(10), 27. Retrieved from https://dialog.proquest.com/professional/docview/668071736?accountid=142257 (Year: 1999).*

* cited by examiner

*Primary Examiner* — Jason B Dunham
*Assistant Examiner* — Anand R Loharikar
(74) *Attorney, Agent, or Firm* — Perkins Coie LLP

(57) ABSTRACT

Online browsing behavior is used to predict the intent of online users dynamically. The category of online user is predicted and the prediction can be used to provide assistance to the user, if required. Such prediction is based on a combination of a Naïve's Bayes classifier and a Markov model.

9 Claims, 17 Drawing Sheets

At $i^{th}$ page, $I_i$ : $i^{th}$ intent (purchase or non purchase)

$X = (x_1, x_2, ....., x_k)$ , static variables $p_h$ = page visited at $h^{th}$ click.

$N_i = (p_1, ...., p_i)$ , naviagtion path $$P[I_i / (X, N_i)] \propto P[I_i] \left( \prod_{k=1}^{k} P[x_k/I_i] \right) (P[p_1/I_i]) \left( \prod_{j=2}^{i} P[p_j/p_{j-1}, I_i] \right)$$

| Metric | Modified naive Bayes | |
| --- | --- | --- |
| | 1st Click | Final Click |
| Total population | 1,823,566 | |
| Population covered | 34.96% | 38.14% |
| Perc purchaser covered | 68.36% | 77.23% |
| Purchase propensity in chat offered class | 3.10% | 3.21% |
| purchase propensity in chat not offered class | 0.77% | 0.58% |

Increase in purchase propensity

FIGURE 6

> Purchase rate as well as coverage increases with navigation data

| Metric | Modified naive Bayes(Clicks) | | | | | | | |
|---|---|---|---|---|---|---|---|---|
| | 1st | 3rd | 5th | 7th | 9th | 11th | 13th | Final(20th) |
| Total population | 1,823,566 → | | | | | | | |
| Population covered( Hot Leads) | 34.96% | 37.40% | 37.75% | 37.94% | 38.02% | 38.06% | 38.11% | 38.14% |
| Perc purchaser covered | 68.36% | 72.50% | 74.19% | 75.44% | 76.02% | 76.48% | 76.80% | 77.23% |
| Purchase rate in chat offered class | 3.10% | 3.07% | 3.12% | 3.16% | 3.17% | 3.19% | 3.20% | 3.21% |
| purchase rate in chat not offered class | 0.77% | 0.69% | 0.66% | 0.63% | 0.61% | 0.60% | 0.59% | 0.58% |

FIGURE 7

| Metric | Modified naïve Bayes | | | |
|---|---|---|---|---|
| | 1st Click | Final Click | | |
| | tol = 0.00 | tol = 0.10 | tol = 0.15 | |
| Total population | 1,823,566 | | | |
| Population covered( Hot Leads) | 34.96% | 38.14% | 41.70% | 43.09% |
| Perc purchaser covered | 68.36% | 77.23% | 79.11% | 79.84% |
| Purchase rate in chat offered class | 3.10% | 3.21% | 3.01% | 2.94% |
| purchase rate in chat not offered class | 0.77% | 0.58% | 0.57% | 0.56% |

FIGURE 8

| | |
|---|---|
| accessory | acessory_drive |
| accessory_bag | acessory_key |
| accessory_Battery | acessory_usb |
| accessory_mouse | cart |
| account | checkout |
| customize | offer |
| deal | order |
| enhance | OTHERS |
| essential | sale |
| home | search |
| idea | ship |
| laptop | shop |
| NA | Think |

FIGURE 12

```
216.239.37.5 - - [17/May/2003:03:41:43 -0500] "GET /~ijcr/Vols/vol10no1.html HTTP/1.0" 200 4568
216.244.111.108 - - [17/May/2003:03:41:51 -0500] "GET /~as/his/ HTTP/1.1" 404 332
28.68.82.18 - - [17/May/2003:03:42:15 -0500] "GET /~pdcp/cfp/cfpBookReviews.html HTTP/1.0" 304 -
24.98.136.62 - - [17/May/2003:03:48:21 -0500] "GET /cs3373/programs/ppm3.dat HTTP/1.1" 200 498
24.98.136.62 - - [17/May/2003:03:48:26 -0500] "GET /cs3373/programs/ppm4.html HTTP/1.1" 200 55
24.98.136.62 - - [17/May/2003:03:48:38 -0500] "GET /cs3373/images/UaTor.gif HTTP/1.1" 200 9921
24.35.232.2 - - [17/May/2003:03:49:40 -0500] "GET /welcome.html HTTP/1.0" 200 523
```

FIGURE 13

DYNAMIC PREDICTION OF ONLINE SHOPPER'S INTENT USING A COMBINATION OF PREDICTION MODELS

CROSS REFERENCE TO RELATED APPLICATIONS

This application claims priority to U.S. provisional patent application Ser. No. 61/762,104, filed Feb. 7, 2013, which is incorporated herein in its entirety by this reference thereto.

BACKGROUND OF THE INVENTION

Technical Field

The invention relates to online browsing behavior. More particularly, the invention relates to dynamically predicting the intent of online visitors early in a browsing session.

Description of the Background Art

The booming growth of the Internet has resulted in a spurt in online business. The convenience of shopping at one's fingertips has attracted customers worldwide. However, new challenges abound for online business organizations, for example where the collection of a user's purchase intention data in marketing research is currently more of a routine analysis that does not produce useful insights. Knowledge of the relationship between the customer's purchase intention and the customer's actual purchase behavior continues to exist at an elementary level. However, developing knowledge of this relationship is especially important for new products, which is the area in which such knowledge is currently least available.

The anonymous nature of online transactions presents a greater challenge for the industry with regard to increasing sales, enhancing the customer experience, and building customer loyalty because it is difficult to assess the customer's browsing patterns in a meaningful way. Such patterns can indicate, for example, the customer's respective needs, expectations, and dislikes. Realizing the merits of online business in the sales and service sector, online business organizations are devising methods of offering personalized Web support to achieve sales goals, such as increasing the conversion rate, reducing the shopping cart abandonment rate, enhancing the customer experience in real time, and so on. Unfortunately, mere personalization as now practiced relies upon historical data that may be stale or disjoint from the customer's current intent To devise a suitable personalized strategy to meet the expectations and needs of online customers, it is necessary to understand the customer's online browsing behavior. Presently, dynamic prediction of the potential intent of an online customer is still at an underdeveloped stage. Moreover, unlike visiting the store physically, online customers face obstacles, such as not being able to see the product physically and not having an option of receiving personal attention for their queries during the process of visiting an online business's Web site.

It would therefore be advantageous to engage with a customer of interest, i.e. a customer who either makes a purchase and accepts chat, or other suitable devices such as dynamic FAQ's, calls, etc.; or accepts chat and may purchase later. This is especially true because the associated cost of missing a customer of interest is high and of cost of targeting the wrong customer is low.

SUMMARY OF THE INVENTION

Embodiments of the invention predict the intent of one or more users in real time, i.e. while they are searching one or more online commerce sites. A user typically connects to a Web site with the intention of performing specific tasks. The user's intent can be to perform one or more goal-oriented searches or one or more exploratory searches. The user's intent may be inferred early in the browsing session based on tracking the Web path that the user follows on the Web site. One or more dynamic models for predicting user intent before the user abandons the Web site are based on a combination of models including, for example, a combination of a Naïve Bayes Classifier and a Markov model. The model adapts depending on the user's location along the search path. The farther along the Web path the user progresses, the more accurate the model's prediction of the user's intent. Increased accuracy in predicting user intent increases relevance of the searches suggested to the user.

BRIEF DESCRIPTION OF THE DRAWINGS

FIG. 6 is a table showing a result comparison reported on full data which identifies an increase in purchase propensity according to the invention;

FIG. 7 is a table showing a result comparison showing the incremental performance of the model, where purchase rate, as well a coverage, increase with navigation data, according to the invention;

FIG. 8 is a table showing variation in coverage in terms of population and purchaser by varying tolerance according to the invention;

FIGS. 11 and 13 are examples of raw web logs captured when an online user visits a Web site according to the invention;

FIG. 12 provides an examples of page categorization according to the invention;

DETAILED DESCRIPTION OF THE INVENTION

Online commerce Web site providers seek to convert users who are searching on their online commerce sites into purchasers of the goods and services that are furnished on the sites. Embodiments of the invention analyze the Web path taken by a user visiting the Web site in real time and, based upon such analysis, use dynamic models to predict user intent early in the user's session.

A user's path at the Web site is collected and analyzed. Predictive models are developed based on the Web path data of one of a plurality of users. These models are tested with the Web path data of another of the plurality of users. The predictive models are then used to predict the intent of the user, and are updated based upon both the user category and by how far along the search path the user has progressed. The predictive models are used to enable a virtual support system which is provided to the user. The dynamically updated predictive models provide better support to the user by providing more relevant search suggestions based on more accurate intent prediction.

Definitions

For purposes of the discussion herein, the following terms have the associated meanings ascribed to them below.

Browser: Users who just browse without purpose.

Knowledge Seeker: Users who browse the website to gather information about products, prices, etc.

Purchaser with Assistance: Users who want to buy but are not very clear and, therefore, need assistance.

Purchaser with Self-help: Users who know exactly what they want and where to find it.

Discussion

In connection with the discussion herein, assume that Web navigation reveals information about a user's purchase intent and that intent either changes or gets stronger as the user's journey matures. Given the user's intent, a page visited at a particular journey point depends only on the last journey point. Thus:

$$P[\text{Page}_i/\text{Page}_{i-1},\text{Page}_{i-2},\ldots,\text{Page}_1,\text{Intent}]=P[\text{Page}_i/\text{Page}_{i-1},\text{Intent}] \quad (1)$$

Embodiments of the invention apply such techniques as a Naïve Bayes' function to predict raw intent with static information only and then combining said Naïve Bayes' function with first-order Markov information to capture the dynamic nature of the user's intent with each step of a user's navigation during a Web journey. In combination, this approach is referred to herein as a modified Naïve Bayes technique (see the discussion below and FIG. 4).

Figure 1:
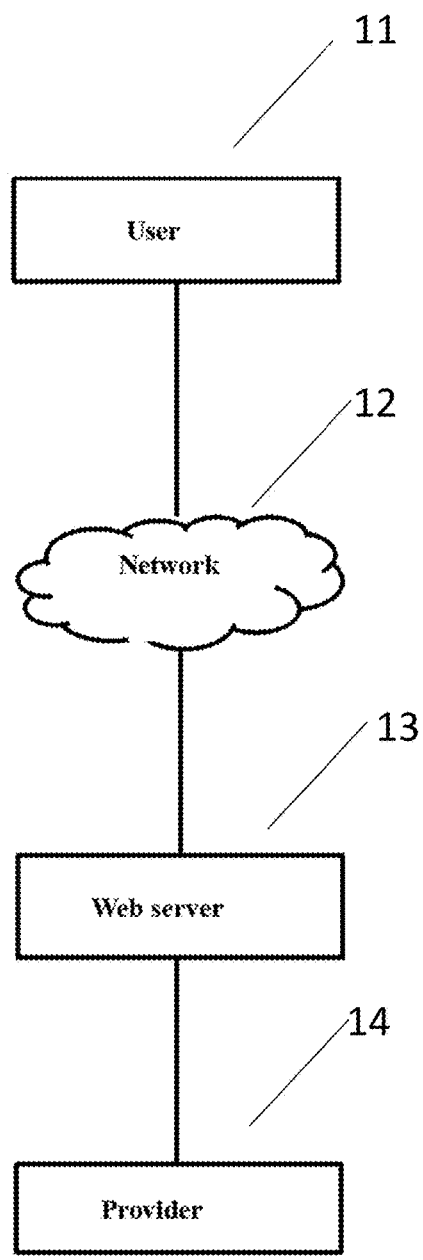
FIG. 1 is a block schematic diagram showing a user interacting with a provider according to the invention.

FIG. 1 is a block schematic diagram showing a user interacting with a provider according to the invention. As shown in FIG. 1, the system comprises a network 12, a Web server 13, and a provider 14. A user 11 communicates and interacts with the provider 14 through the network 12 and the Web server 13, which enables such communication and interaction.

In an embodiment of the invention, the user may be an individual, group, organization, client, server, and the like. In another embodiment of the invention, the user may communicate and interact with the Web provider with a user device. The user device may be any of a mobile phone, desktop computer, laptop, tablet, or any other device which enables the communication.

The network may use any suitable communication technology that allows communication with the user. The provider is any provider of information, services, and/or goods. In an embodiment of the invention, communication or interaction may occur between the user and the provider through an agent. The agent may be human, automated, or any other mechanism which enables the interaction. The user may communicate with the provider using any of a plurality of channels. The user may use the Web server 13 to link to the provider, or the user may directly communicate with the provider.

Data traffic at the Web server can be analyzed by collecting click-stream data related to the path that the user takes when navigating through the Web site of the provider. Clickstream data can be collected, for example, from Web servers. users' Internet service providers, or JavaScript tags.

For purposes of the discussion herein, a click-stream is a record of the user's activity on the Internet including such factors as every Web site and every page of every Web site that the user visits, how long the user was on a page or site, in what order the pages were visited, any newsgroups in which the user participates, and the addresses of any email that the user sends and receives. For purposes of the discussion herein, the path taken by the user reflects the user's intents, needs, and goals.

Users initially visit a Web site having a specific intent. This intent may evolve over a period of time during the process of browsing the Web site or related Web sites. For purposes of the discussion herein online search behavior is generally categorized into two categories, i.e. a goal-oriented search and an exploratory search. Janiszewski (1998) proposed a binary categorization of user's intent to visit a website into goal-directed intent versus exploratory intent. Goal-directed intent refers to behavior for which the user has a specific intent, such as making a purchase. On the other hand, some users browse Web sites to gather information about products, accessories, shipping details, and so on, but they may not have an intent to make a purchase. Such an intent to search the website is referred to as exploratory intent.

By extending the general level of categorization of online search behavior, a plurality of intents can be developed. The types of intent so developed can comprise directed-purchase visits, search and deliberation visits, hedonic-browsing visits, and knowledge-building visits. The above listed intents are merely exemplary and a person of ordinary skill in the art will appreciate that other types of intent can be developed within the scope of the invention herein.

Based on the types of intent developed, a user may belong to one of the following categories:

Knowledge seeker;
Browser;
Prospect; or
Customer.

The above mentioned categories of users are provided as examples of categories. Those skilled in the art will appreciate that other categories of users may be provided, based on the user's intent.

Figure 2:
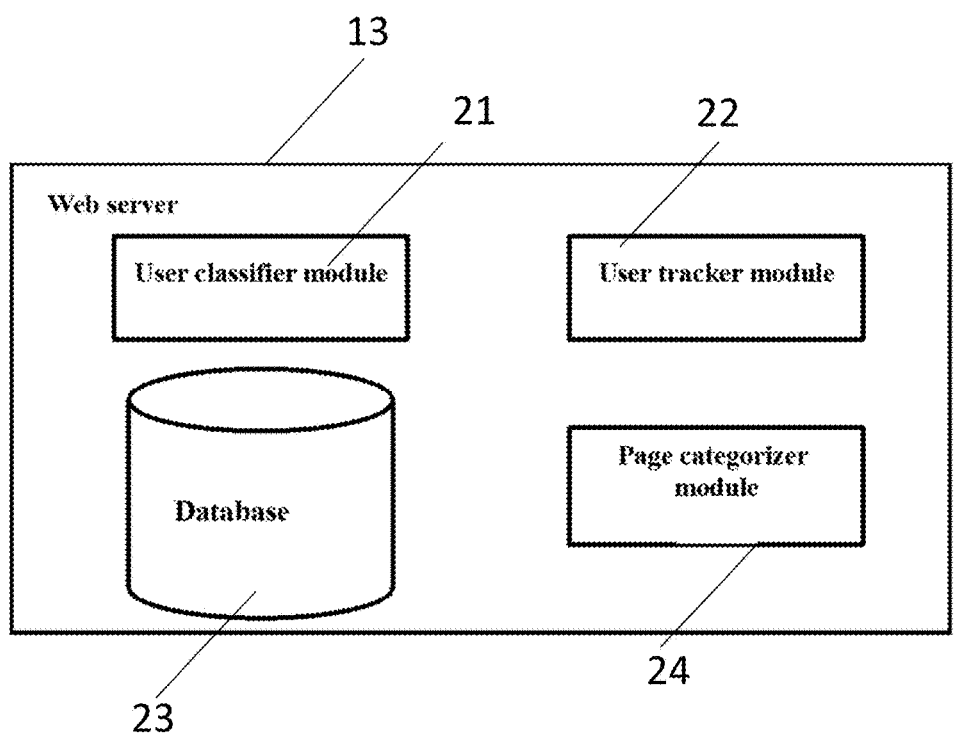
FIG. 2 is a block schematic diagram showing the components and functioning of a Web server according to the invention.

FIG. 2 is a block schematic diagram showing the components and functioning of a Web server according to the invention. As shown in FIG. 2, the Web server 13 comprises various modules, such as a user classifier module 21, a user tracker module 22, a database 23, and a page categorizer module 24.

The user classifier module 21 classifies users into one of the four categories by taking into account the browsing behavior of the user. As discussed in greater detail below, a combination of Naïve Bayes and Markov models is used to classify the user into one of the intent classes. The user tracker module 22 is a monitoring element which tracks and closely monitors user browsing behavior, and which reports the activities of the user to the user classifier module. User information may be collected from any of a plurality of sources including, but not limited to the user's device or Internet service provider (ISP). Further, the information acquired may include search terms in particular Web pages, Web sites, and actions taken at the Web sites. The information may also be collected from a plurality of users and compiled or aggregated to provide a statistical model. In embodiments of the invention, the top number of key words, search strings, and tags, for example, are stored in the database 23. The database 23 may be used for a lookup upon receiving a new query.

Every Web site that is accessible via the Web server may comprise a substantial number of Uniform Resource Locators (URLs) and, typically, a user visit during an online session comprises of a subset of these URLs. The page categorizer module 204 reduces the URL's into a smaller group of categories. Usually, a website consists of a large number of URL's which can be grouped into a smaller set of categories, which are referred to as page types. To do this, a category map which defines a mapping from URLs to pre-specified categories is created, based on business requirements. For example, for an e-retailer selling computers, category mapping can be created as shown in Table 1 below.

TABLE 1

Category Mapping

| Sr. No. | URL | Category |
|---|---|---|
| 1 | http://www.abccompany.com/products/us/laptop/modelname/modeltype-/index.html http://www.abccompany.com/products/us/laptop/modelname/price//index.html | Laptop |
| 2 | http://www.abccompany.com/products/us/tabletmodeltype/ . . . \ . . . | Tablet |
| 3 | http://www.abccompany.com/.svcart_save.asp | shopping cart |
| 4 | http://www.abccompany.com/.chkout1.asp http://www.abccompany.com/.chkout2.asp | Checkout |

The creation of category maps achieves two objectives, i.e. it produces a smaller set of meaningful pages which the human mind can understand and interpret; and it reduces the dimensionality of a predictor set, thereby improving accuracy of the predictive model.

Figure 3:
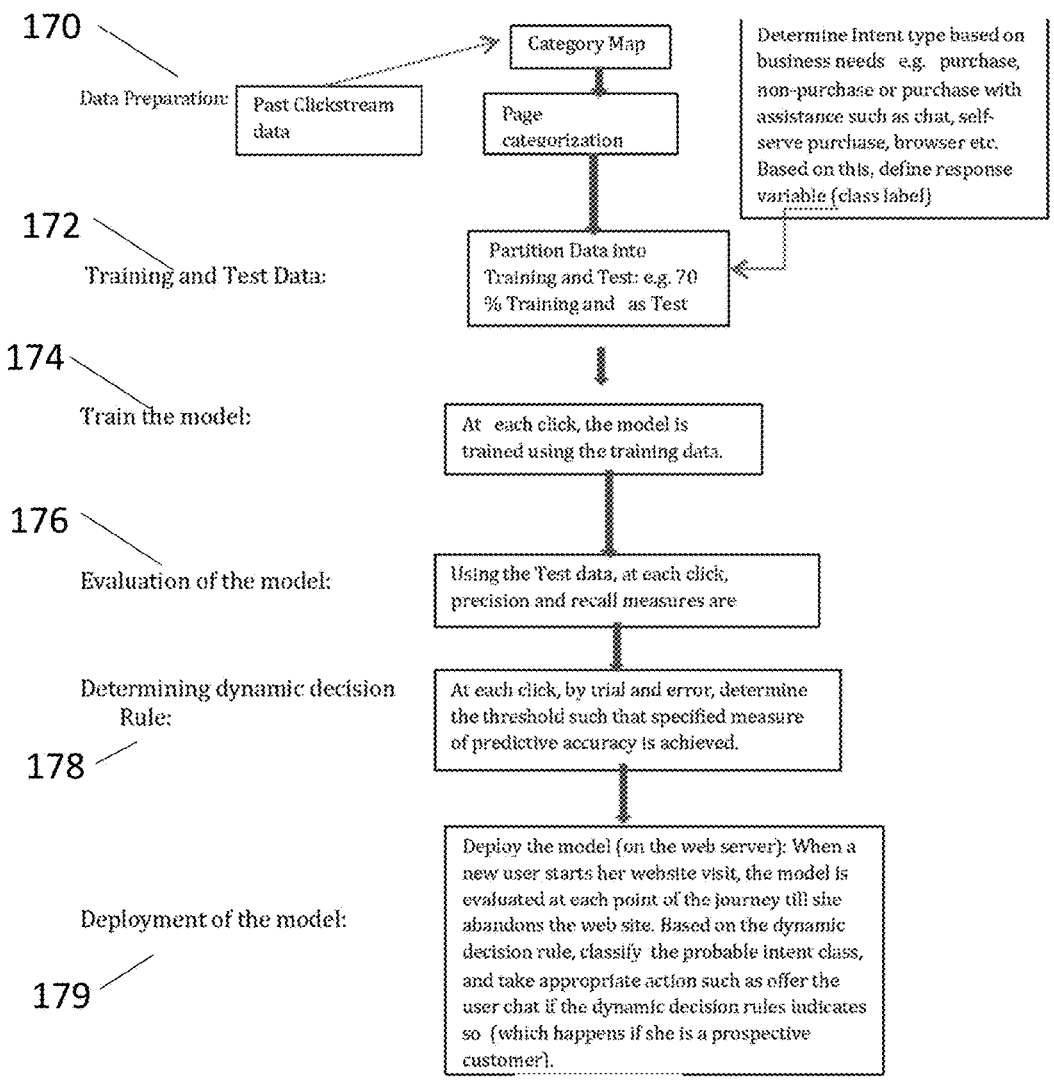
FIG. 3 is a flow diagram showing model development and deployment flow according to the invention.

FIG. 3 is a flow diagram showing model development and deployment flow according to the invention. In FIG. 3, a data preparation phase (170) takes past clickstream data, converts the data to a category map, and then performs page categorization A training and test data phase (172) partitions the data into training and test data, e.g. 70% of the data is used as training data and 30% of the data is used as test data. This stage determines intent type based upon business needs, e.g. purchase, non-purchase, or purchase with assistance such as chat, self-serve purchase, browser, etc. Based upon the determined intent, a response variable, i.e. class label, is defined.

A model training phase (174) uses the training data to train the model at each click.

A model evaluation phase (176) uses the test data, at each click, to compute precision and recall measures.

A dynamic decision rule determination phase (178) determines the threshold at each click, by trial and error, such that a specified measure of predictive accuracy is achieved.

A model deployment phase (179) deploys the model on the Web server. When a new user starts a website visit, the model is evaluated at each point of the journey until the user abandons the website. Based on the dynamic decision rule, the user is classified into a probable intent class and appropriate action is taken, such as offering chat to the user if the dynamic decision rules indicates so.

Initially, Web page categorization (170) is enabled by the page categorizer model 24 which combines similar types of URLs that are available in the provider Web site. The business interests, requirements, and similarity of URLs determines the nature of page types. The page types include, for example, home, customize, products, carts, and so on.

Primarily, a Web site comprises a substantial number of Web pages. Therefore, when a user searches for some relevant information, the user may have to spend a considerable amount of time and energy to find the desired information. If the Web site of the provider does not provide virtual assistance, the user may exit the Web site. Embodiments of the invention provide a virtual support system which is offered to the user in the form of chat, interactive voice response (IVR), and the like while the user navigates the provider's Web site. The intent of the user may also be inferred with enhanced accuracy if a virtual support system is provided. This is provided in real time. As discussed below, a threshold value is provided that determines when the user is to be contacted, for example, with a chat request.

The entire navigational data of the user is transformed into a new set by the page categorizer module 24, for example, by creating a category map (see above) based on business requirements and a desired level of granularity. e.g. a URL of type http://www.abcdcompany.com/beauty-fragrance-women-s-fragrance/b-1023368?keywordSearch=false&sortOption=UNITS_HIGH_TO_LOW&viewItems=50&part Number=0787468901000 can be categorized into "\fragrance\women\" which can be easily interpreted.

As discussed above, intents are predefined or can be derived from the past clickstream data. For example, using information on the purchase status and the status of acceptance or otherwise of the online support offered, if any, to a user during the user's Web journey, the user's intent of visiting the website can be defined as shown in Table 2 below.

TABLE 2

USER INTENT CATEGORIZATION

| Response variable: Intent types | Criterion used to Categorize Intent Type |
|---|---|
| Knowledge Gathering | Used Proactive Chat but did not purchase |
| Browsing | Did not Use Chat nor purchased any item |
| Likely to Purchase | Used Chat and Purchased |
| Purchase via self-support | Rejected Chat offer but purchased-preferred self-support to purchase |

Table 2 shows the different types of intent, based on the likelihood to use chat, IVR, or any suitable channel to resolve the user's queries.

The database 23 captures user-related data concerning the user's visits to an online commerce Web site. The information pertains to the user's ID, the browser used, referral, search words, start time, and so on, along with the navigational journey, and related information, such as the sequence of pages (URLs) visited during a session, time spent on the page, and so on. Further, it is assumed that the users are provided with virtual assistance, if requested, during a session. In an embodiment of the invention, the virtual assistance may be in the form of Web-based support, IVR, and the like.

The user-related data which is captured is modeled (174) to transform the data by applying the process of step (170). The resulting data is used to create training and testing data for a plurality of users. For example, in embodiments of the invention 70% of the users are selected randomly to train the model, while the remaining 30% of the users are used to evaluate the model.

Once the data is modeled, the user's intent is dynamically predicted (179). Because the online behavior of the user can evolve over time, static models may not be appropriate and, therefore, a model which takes into account the dynamic nature of user interaction during the user's journey is essential. Thus, embodiments of the invention employ a model which is a combination of a Naïve Bayes classifier and a Markov model.

Modified Navïve Bayes Model

Figure 4:
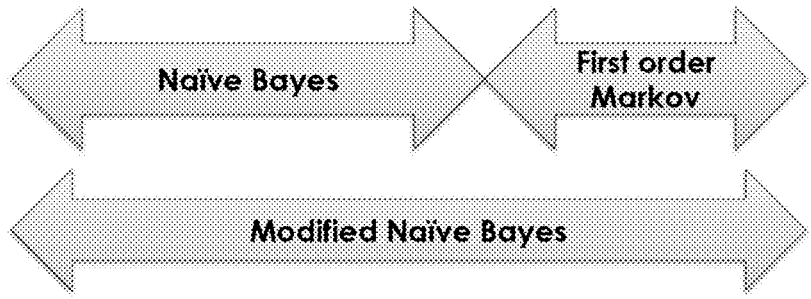
FIG. 4 is a diagram of a modified Naïve Bayes model according to the invention.

FIG. 4 is a diagram of a modified Naïve Bayes model according to the invention. To understand this model, consider the online user's session visit, i.e. click stream data. Once the raw data is pre-processed, the transformed data as obtained in steps (170) and (171) is obtained.

The set of (k+m) variables, referred to herein as predictors, is measured for an online user who is browsing an online commerce site. The set of (k+m) predictors may be denoted by X. Further, assume Xi: i=1, 2 ... k to be the set of k predictors which are available at the outset of the visit. The predictors may include variables, such as session start time, Internet protocol (IP) used, operating system (OS) used, browser used, and so on. X indicates the fixed length set of variables.

Further, consider Ut=(u1; u2; u3 ... ut) to be a sequence of uniform resource locators (URLs) that were viewed by a user during the navigational journey up to the click (t=1, 2 ... ). Due to its dynamic nature, Ut is referred as a variable length set of variables. Let Ci denote the i-th Intent that is C1=browser, C4=self_help purchaser.

Once the data is preprocessed, a model is developed to predict the intent of a user by computing the probabilities at the t-th click and the decision is based on a comparison of the below Equation (1) with a certain level of pre-determined threshold.

$$P[(X, Ut) \in \text{Intent} Ci] \qquad (1)$$

Further, as the user's journey of navigating the Web site progresses, Equation (1) is updated and the understanding of the intent of the user evolves. As a result, the user may be engaged by offering to the user a suitable form of interaction in response to the user's queries. Further, if all of the predictors are assumed as a set of (k+m) independent predictors, then:

$$P[(X, Ut) \in Ci] = (P[Ci]\Pi_{j=1}^{k} P[Xj|Ci]\Pi_{j=1}^{t} P[uj|Ci])/P[(X, Ut)] \qquad (2)$$

From Equation (2), X and Ut are separated to discriminate between the fixed and variable part. The information about the fixed set of variables is available during the beginning of the Web site visit. Consider that the probability of a sequence of page visits that is conditional on the intent Ci, i=1, 2, 3, 4 to be $$P(Ut|Ci) = P(u1, u2, \ldots ut|Ci) \qquad (3)$$

Equation (1) may be closely approximated by a first order Markov chain. Assuming that the next page visit of the user depends on the previous visit, the first order Markov chain may be approximated as:

$$\Pi_{j=1}^{t} P[uj|u(j-1), Ci] \qquad (4)$$

The transition probabilities of visiting the j-th page, assuming that the intent of the user is Ci and the previous visit is on the Web page j-1, may be computed using the observed counts in each of the user intent counts. Further, when the transition probabilities of the desired order are computed, the estimates are:

$$P[(X, Ut) \in \text{Intent} Ci = P[Ci]\Pi_{j=1}^{k} P[Xj|Ci]\Pi_{j=1}^{t} P[uj|(j-1), Ci] \qquad (5)$$

For each intent category, Equation (5) is computed at each click t and the intent (Ci) is predicted based on:

$$\text{Argmax } P[Ci]\Pi_{j=1}^{k} P[Xj|Ci]\Pi_{j=1}^{t} P[uj|u(j-1), Ci] \qquad (6)$$

The model is trained after computing the required probabilities and transition probabilities matrices corresponding to the training data available at the t-th click. Because not all users have the same session length, e.g. one or more of the users may exit after visiting a few pages, the model must be trained accordingly. The final trained model comprises a collection of models corresponding to each page, along with the decision criterion that is used to predict the intent of the user.

The combined Naïve Bayes classifier model is evaluated. Precision and recall measures are used to measure the predictive accuracy of the model. These measures are computed on the test data. At each click, precision and recall are computed based on a confusion matrix, which is shown in Table 3 below.

TABLE 3

Confusion Matrix

|  |  | Predicted Intent Type | |
| --- | --- | --- | --- |
|  |  | Purchase | Non-purchase |
| Actual Intent Type | Purchase | True positives(a) | False negatives (b) |
|  | Non-purchase | False positives (c) | True negatives (d) |
|  | Precision = | b/(b + d) | |
|  | Recall = | b/(a + b) | |

Finally, the model is deployed (179) and the decision is taken to determine the category of intent.

The various actions shown in FIG. 3 may be performed in the order presented, in a different order, or simultaneously. Further, in some embodiments of the invention, some actions shown in FIG. 3 may be omitted.

Example

Consider an example where Web log data is collected on behalf of an e-retailer who sells computers and accessories online. The historical dataset comprises the information on the pages visited by online users. Subsequent to capturing the raw click stream data and performing steps (170) and (171) of FIG. 3, the transformed data for all users is stored in a database. The data is stored in a format having two components, i.e. a static part (see Table 4 below) which consists of the user-Id, visit start time and day, OS used, browser used, referral source, search words used, and so on, which are available for every user when the user starts a visit. On the other hand, the user's navigational journey information varies as a function of time. In other words, some users abandon the visit after visiting two pages; some do so after visiting four pages, and so on. The length of the clickstream's sequence varies. This component is referred to as the dynamic part (see Table 5 below), which consists of a sequence of page visits, time spent on viewing pages. Items kept in shopping cart, etc.

TABLE 4

USER'S VISIT: STATIC PART

| Session ID | Session start time | Day of the visit | Browser type | Referral source | Operating System | ... |
| --- | --- | --- | --- | --- | --- | --- |

TABLE 5

| | | | | Dynamic Part: Navigational Journey | | | |
|---|---|---|---|---|---|---|---|
| Click-1 | Click-2 | Click k | Chat status | Purchase status | Time spent on click 1 | Time spent on Click k | |

Where click-k stores the page type visited on the k-th click by the user during the session. For example, information about a specific user who first visits a home page, views it for 13 seconds, and then proceeds to product page and spends 330 seconds on the customized page is stored as is shown in Table 6 below.

TABLE 6

| | | | | Page Type Stored | | | |
|---|---|---|---|---|---|---|---|
| Click-1 | Click-2 | Click-3 | Click-5 | Time spent on click-1 (sec) | Time spent on click-4(sec) | Chat Status | Purchased status |
| Home | Product | customize | Exit | 13 | 330 | Chat accepted | purchased |

After each click, the number of visits by the user decreases because one or more of the users may exit from the Web site. After k-th click, $n_k$ number of visitors are left. By using this data set, the next training and test data required at the k-th stage may be evaluated by the following steps:

1. Selection of training and test data at the k-th click: As described in step (172) of FIG. 3, a balanced training set comprising 70% of the users from the available users at the k-th click are selected for training the model and the remaining 30% are kept for testing the model.
2. Training the model: Using the training data, the combined model is trained at each k-th click.
3. Evaluation of the accuracy of the model: Using the test data, the precision and recall measures are computed.
4. Decision rule at each click: The model is evaluated at each click, and the probability estimates are obtained. Based on the maximum value of these estimates at each click, the user is classified into the corresponding intent class. Because the classification decision is based on the estimated probabilities at each click, dynamic decision rules or cutoffs are selected so that desired accuracy of the model is achieved. For example, if there is less cost associated with classifying non-purchasers to a purchase intent class, the cutoffs can be chosen to be a small number, such as 0.2. One such rule is described below.

Figure 5:
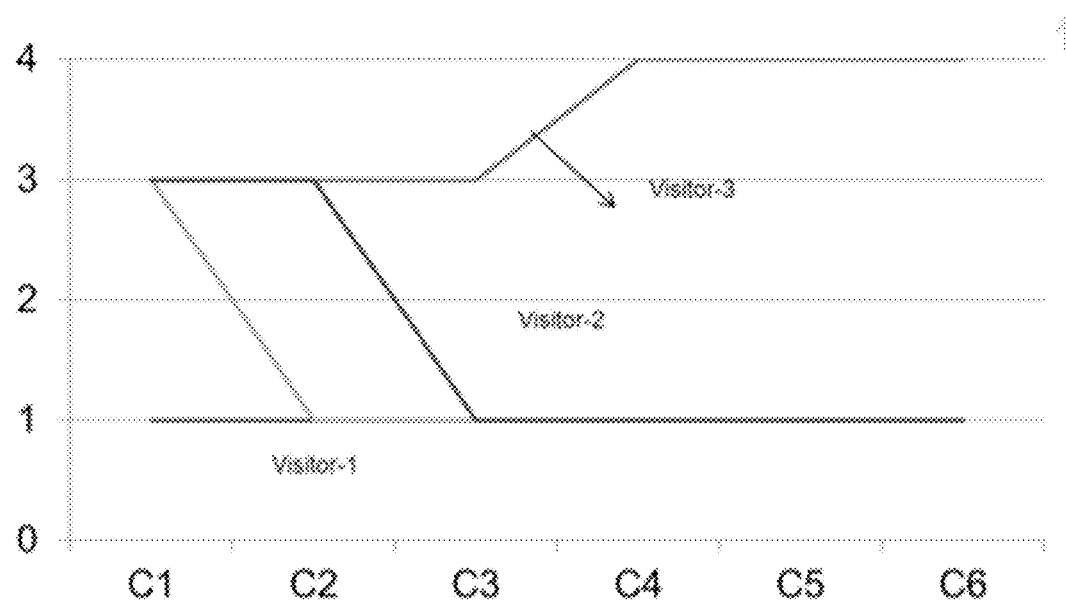
FIG. 5 is a graph showing the evolution of user over time according to the invention.

FIG. 5 is a graph showing the evolution of user over time according to the invention. As shown in FIG. 5, visitor 3 was classified as belonging to the chat-assisted purchaser type of intent but, when the visitor moves on to visit a next page, the intent is reclassified as a self-assisted purchaser. Therefore, to determine the intent of a user, the following rules take into account the cost associated with an error of misclassification:

1. Decision is not taken until the user completes at least two page visits.
2. If the model output based on the two successive clicks indicates the intent as browser, the model continues to look for further information and so no decision is taken.
3. If the model output based on the two successive clicks indicates the intent as self-help purchaser, decision is not taken.
4. In all other cases, the user needs assistance and the system makes the chat offer. Thereafter, the combined model is not evaluated.

The output produced by the proposed model, as shown in FIG. 5, depicts the predictive accuracy of the model. As the Web visit progresses, the model accurately discovers the user's intent. Because the model incorporates the dynamic information and learns the intent of the user incrementally, suitable personalized intervention can be planned proactively which, in turn, helps to achieve sales goals. For example, suppose a user is visiting a product page, e.g. for laptops, and is viewing the product's details. At this stage, the user may need some help to know more information about the configuration of the system so that he can decide whether this meets his requirements or not. If the user's need or 'seek assistance intent' is proactively detected by the model, the seller can offer chat assistance to the user help him make the right decision at right time before quitting the website.

Example

In the following example, the data source is taken from 28 days of user browser session data for an ABC Company personal computer product. Table 7 below shows the static data; and Table 8 below shows the dynamic data. The data set consists of two components, i.e. static and dynamic information on 1,823,566 visitors during the period Jul. 1, 2012-Jul. 28, 2012.

TABLE 7

| Static Data | | | | | |
|---|---|---|---|---|---|
| bsid | ip | TIME_SPLIT | Referral | Browser | OPERATING_SYSTEM |
| 1341891247388-302865 | 50.53.116.251 | N | NULL | Safari | Mac OS X |
| 1341890946161-363218 | 74.77.182.136 | N | NULL | Firefox | WinXP |
| 1341892295726-816137 | 216.148.217.125 | N | OTHERS | Firefox | WinXP |
| 1341892295726-816137 | 216.148.217.125 | N | OTHERS | Firefox | WinXP |

TABLE 8

Dynamic Data

| nav_path_page1 | nav_path_page2 | nav_path_page3 | ... | nav_path_page20 |
|---|---|---|---|---|
| customize | cart | checkout | | |
| shop | OTHERS | OTHERS | | account |
| account | cart | checkout | | |
| checkout | checkout | home | | home |
| checkout | checkout | checkout | | |

Model Fitting

FIG. 6 is a table showing a result comparison reported on full data which identifies an increase in purchase propensity according to the invention.

FIG. 7 is a table showing a result comparison showing the incremental performance of the model, where purchase rate, as well a coverage, increase with navigation data, according to the invention.

FIG. 8 is a table showing variation in coverage in terms of population and purchaser by varying tolerance according to the invention.

Figure 9:
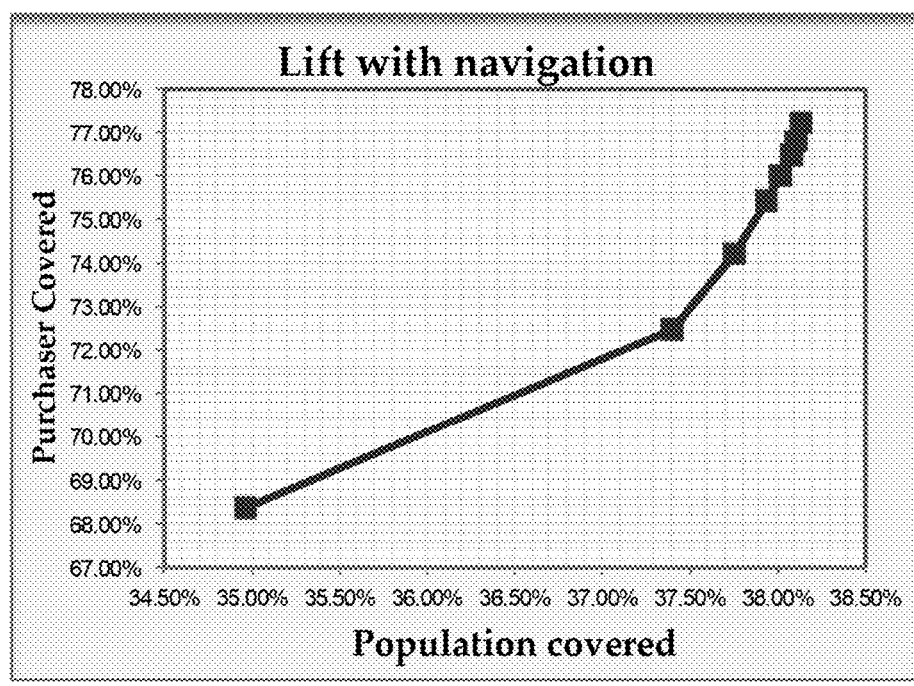
FIG. 9 shows that the % purchaser covered per % population increases with information, i.e. at higher clicks, according to the invention.

FIG. 9 shows graphically how % purchaser covered per % population increases when more information is available, i.e. at higher clicks, according to the invention.

Figure 10:
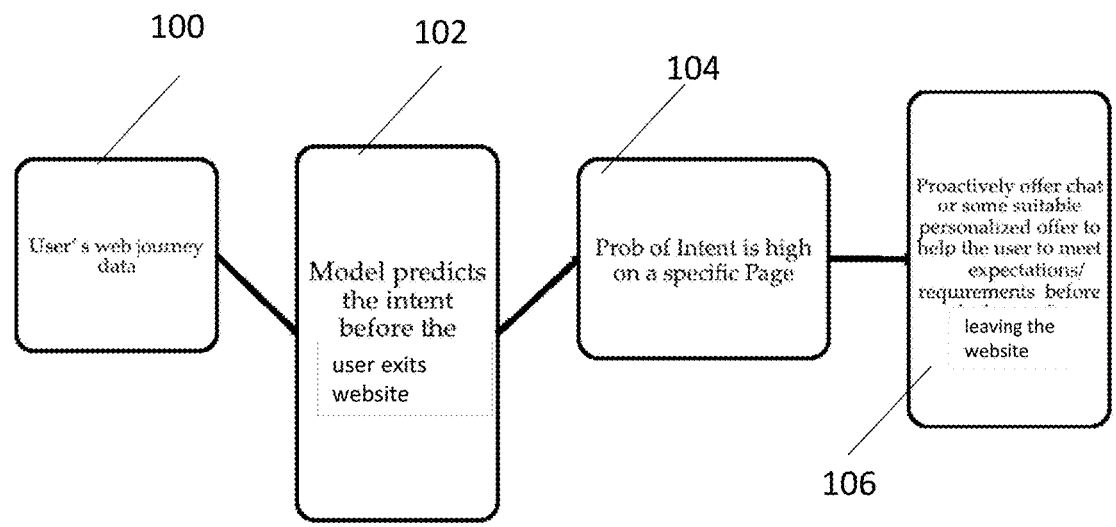
FIG. 10 is a block schematic diagram showing deployment of the model according to the invention.

FIG. 10 is a block schematic diagram showing deployment of the model according to the invention. In FIG. 10, the user's Web journey data is received (100). The model predicts the user's intent before the user exits the Web site (102). It is determined that the probability of a particular intent is high on a specific page (104). The user is proactively offered chat or some suitable personalized offer to help the user meet his expectations and/or requirements before the user leaves the Web site (106).

Data Collection Example

Figure 11:
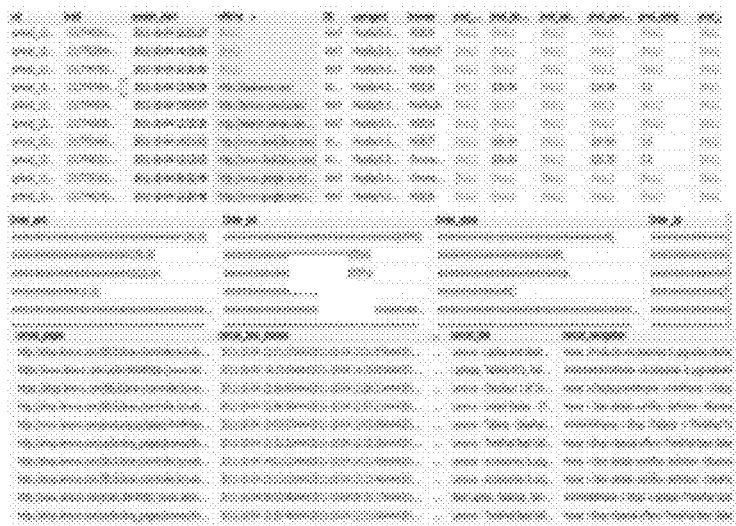

FIGS. 11 and 13 are examples of raw web logs captured when an online user visits a Web site according to the invention. The sample data shown here contains the URLs, time of visit, OS used, etc.

FIG. 12 provides example of page categorization according to the invention

Figure 14:
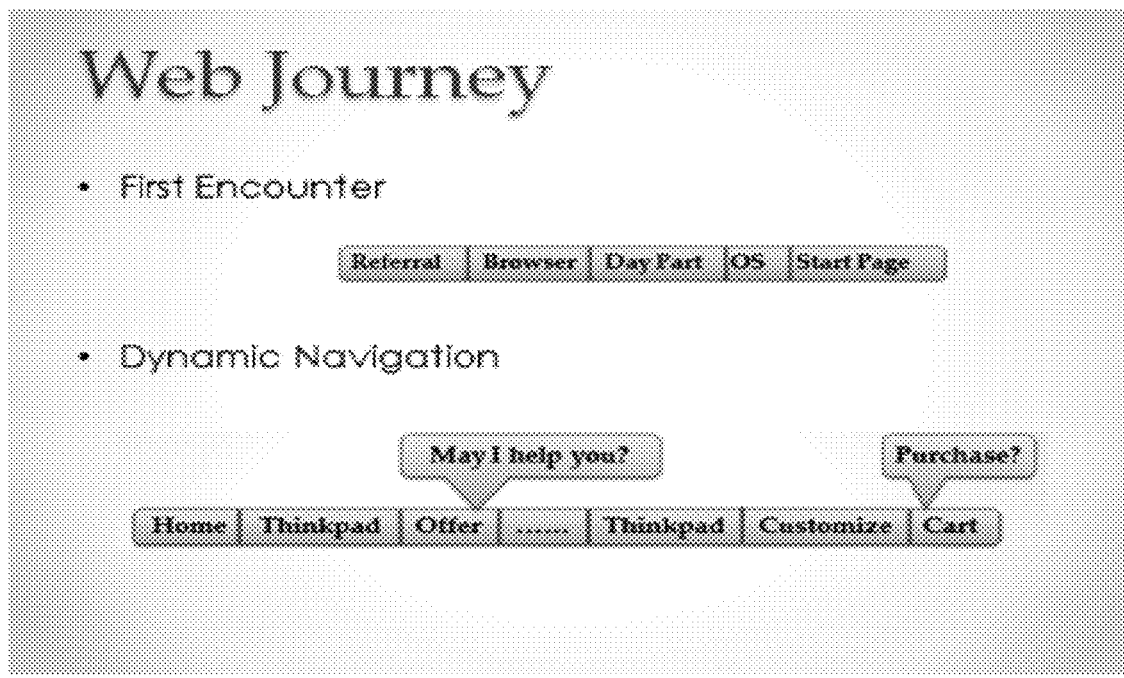
FIG. 14 is an example showing how a Web journey appears after data processing according to the invention.

FIG. 14 is an example showing how a Web journey appears after data processing according to the invention. As soon as the user visits on the website, user data such as referral used to arrive at this website, browser type used, visit start time, operating system (OS) used, landing page, etc. is recorded, followed by the user's journey sequence in the clickstream FIG. 14 shows that the user is offered chat assistance when the user is on the 'Offer' page because the deployed model must have indicated the user's probable intent as 'likely purchaser' with the help of assistance'.

Figure 15:
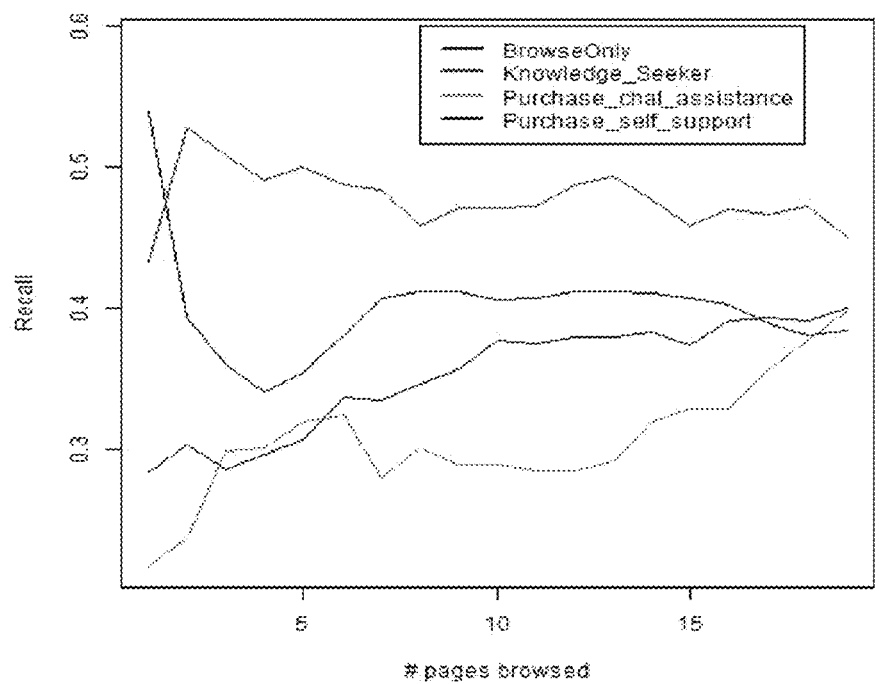
FIG. 15 is a graph showing performance of the model according to the invention.
Figure 16:
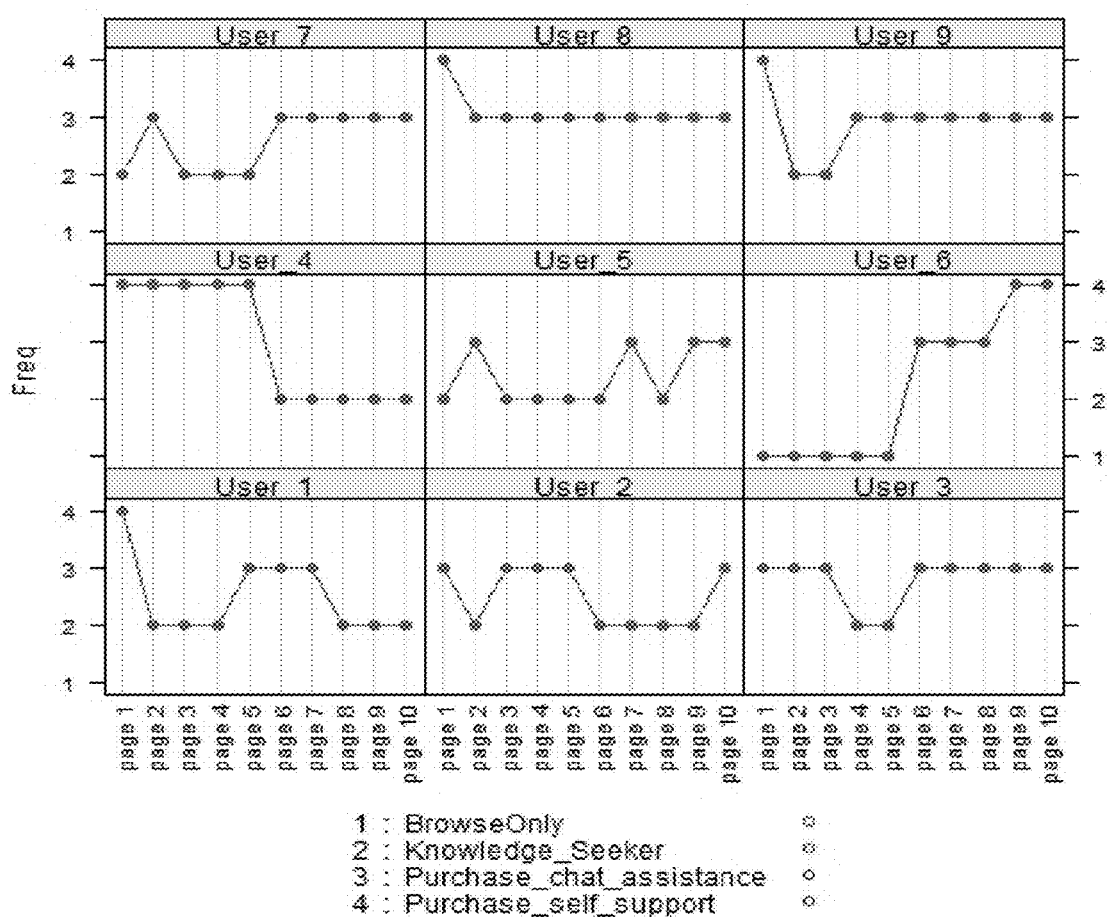
FIG. 16 is a series of graphs for a plurality of users based upon user category according to the invention.

FIG. 15 is a graph showing performance of the model according to the invention. Precision and recall measures at each click are computed and plotted to depict the changes in these values as the user continues to browse the website. The more the pages are viewed by the user when his intent is 'knowledge seeker', the higher the probability estimates. This implies that the model is more sensitive in classifying this intent type, as compared to other types, based on the limited information, FIG. 16 is a series of graphs for a plurality of users based upon user category according to the invention. FIG. 16 shows how the user's intent changes over the time as the user's navigational journey progresses.

Model Development and Deployment Flow

Computer Implementation

Figure 17:
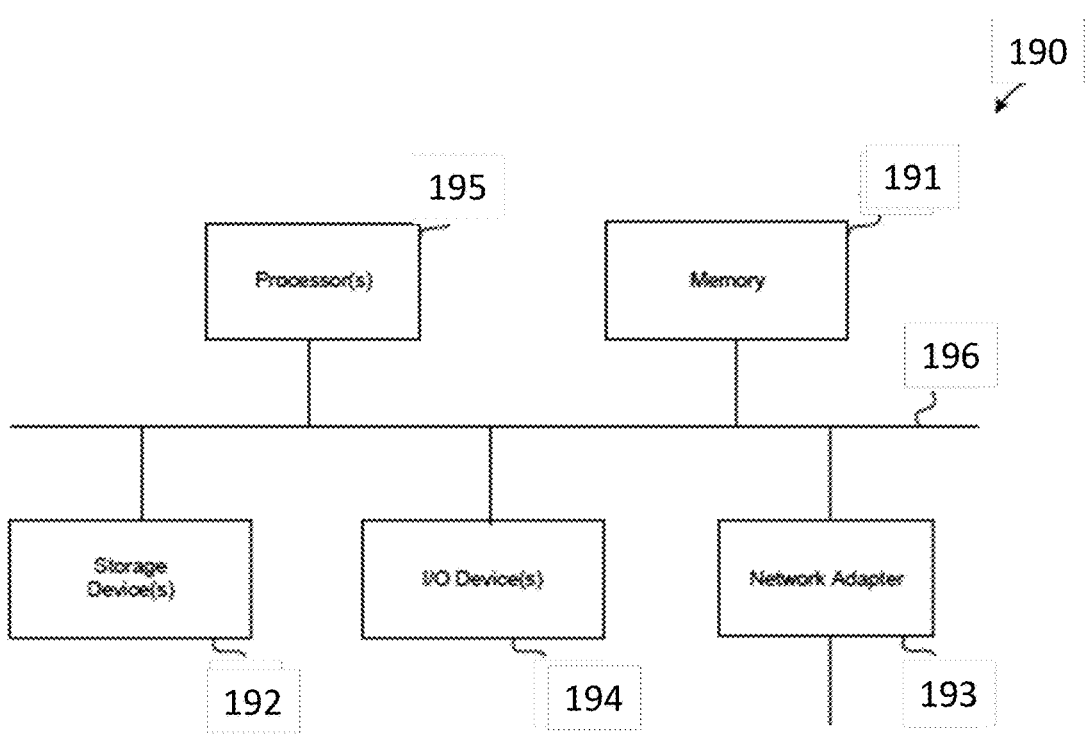
FIG. 17 is a block schematic diagram showing a machine in the example form of a computer system within which a set of instructions for causing the machine to perform one or more of the methodologies discussed herein may be executed.

FIG. 17 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 190 may include one or more central processing units ("processors") 195, memory 191, input/output devices 194, e.g. keyboard and pointing devices, touch devices, display devices, storage devices 192, e.g. disk drives, and network adapters 193, e.g. network interfaces, that are connected to an interconnect 196.

In FIG. 17, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 191 and storage devices 192 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 191 can be implemented as software and/or firmware to program one or more processors to carry out the actions described above. In some embodiments of the invention, such software or firmware may be initially provided to the processing system 190 by downloading it from a remote system through the computing system, e.g. via the network adapter 193.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for user intent analysis, comprising:
   providing a processor configured for receiving a user Web server request from a user device through at least one of a plurality of channels;
   said processor collecting data traffic of the user at the Web server;
   said processor analyzing Web path taken by the user in real time while the user is visiting a Web site;
   said processor developing at least two predictive models based on said Web path analysis by:
      applying a Naïve Bayes' function to predict raw intent with static information only; and
      combining results of said Naïve Bayes' function with first-order Markov information to capture a dynamic nature of user intent with each step of a user's navigation during a Web journey;
   said processor testing said at least two predictive models with Web path data of another of a plurality of users;
   based upon said path analysis, said processor using dynamic models to infer user intent from the Web path as the user visit to the Web site commences;
   based on said path analysis, said processor categorizing said user as any of:
   a browser comprising users who browse without purpose;
   a knowledge seeker comprising users who browse to gather information;
   a purchaser with assistance comprising users who want to buy but are not very clear and, therefore, need assistance; and
   a purchaser with self-help comprising users who know exactly what is wanted and where to find it;
      said processor updating said predictive models based upon both a user category and by how far along a search path the user has progressed;
      said processor using said predictive models to predict the intent of the user before the user exits the Web site; and
      in response to the models predicting that the probability of a particular intent is high on a specific page, and before the user leaves the Web site, said processor proactively offering said user any of chat and a personalized offer to help meet any of the user's expectations and requirements on said user device.

2. The method of claim 1, further comprising:
   based on said path analysis, said processor categorizing said user as any of:
   a browser comprising users who browse without purpose;
   a knowledge seeker comprising users who browse to gather information;
   a purchaser with assistance comprising users who want to buy but are not very clear and, therefore, need assistance; and
   a purchaser with self-help comprising users who know exactly what is wanted and where to find it.

3. The method of claim 1, wherein said user's Web navigation reveals information about a user's intent; and
   wherein said intent either changes or gets stronger as the user's Web journey matures.

4. The method of claim 1, further comprising:
   analyzing data traffic at a Web server by collecting click-stream data related to a Web path that said user takes when navigating through a Web site of a provider.

5. The method of claim 4, wherein said click-stream comprises a record of said user's activity on the Internet including factors that comprise any of every Web site and every page of every Web site that the user visits, how long the user was on a page or site, in what order the pages were visited, any newsgroups in which the user participates, and the addresses of any email that the user sends and receives; and
   wherein the path Web taken by the user reflects the user's intents, needs, and goals.

6. The method of claim 1, wherein said user's online search behavior comprise any of goal-oriented search and exploratory search.

7. The method of claim 1, further comprising:
   categorizing said user's online search behavior to develop a plurality of intents comprising any of directed-purchase visits, search and deliberation visits, hedonic-browsing visits, and knowledge-building visits.

8. The method of claim 1, wherein a user may belong to one of the following categories: knowledge seeker, browser, prospect, or customer.

9. An apparatus for user intent analysis, comprising:
   a processor receiving a user Web server request from a user device through at least one of a plurality of channels;
   said processor collecting data traffic of the user at the Web server;
   said processor analyzing Web path taken by the user in real time while the user is visiting a Web site;
   said processor developing at least two predictive models based on said Web path analysis by:
      applying a Naïve Bayes' function to predict raw intent with static information only; and
      combining results of said Naïve Bayes' function with first-order Markov information to capture a dynamic nature of user intent with each step of a user's navigation during a Web journey;
   said processor testing said at least two predictive models with Web path data of another of a plurality of users;
   based upon said path analysis, said processor using dynamic models to infer user intent from the Web path as the user visit to the Web site commences;
   based on said path analysis, said processor categorizing said user as any of:
   a browser comprising users who browse without purpose;
   a knowledge seeker comprising users who browse to gather information;
   a purchaser with assistance comprising users who want to buy but are not very clear and, therefore, need assistance; and
   a purchaser with self-help comprising users who know exactly what is wanted and where to find it;
      said processor updating said predictive models based upon both a user category and by how far along a search path the user has progressed;
      said processor using said predictive models to predict the intent of the user before the user exits the Web site; and in response to the models predicting that the probability of a particular intent is high on a specific page, and before the user leaves the Web site, said processor proactively offering said user any of chat and a personalized offer to help meet any of the user's expectations and requirements on said user device.

\* \* \* \* \*

UNITED STATES PATENT AND TRADEMARK OFFICE
CERTIFICATE OF CORRECTION

PATENT NO. : 10,373,177 B2
APPLICATION NO. : 14/174678
DATED : August 6, 2019
INVENTOR(S) : Ravi Vijayaraghavan et al.

It is certified that error appears in the above-identified patent and that said Letters Patent is hereby corrected as shown below:

On the Title Page

(71) Applicant: Please change "[24] 7.ai, Inc." to --[24]7.ai, Inc.--.

(73) Assignee: Please change "[24] 7 .ai, Inc." to --[24]7.ai, Inc.--.

Signed and Sealed this
First Day of October, 2019

Andrei Iancu
*Director of the United States Patent and Trademark Office*